(12) United States Patent
Green et al.

(10) Patent No.: US 9,015,010 B2
(45) Date of Patent: Apr. 21, 2015

(54) SYSTEMS AND METHODS FOR SUBSURFACE ELECTROMAGNETIC MAPPING

(75) Inventors: Kenneth E. Green, Houston, TX (US);
Leslie A. Wahrmund, Kingwood, TX (US); Olivier M. Burtz, London (GB);
Dennis E. Willen, Houston, TX (US);
Rebecca L. Saltzer, Houston, TX (US);
Leonard J. Srnka, Bellaire, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 1063 days.

(21) Appl. No.: 13/056,041

(22) PCT Filed: Aug. 31, 2009

(86) PCT No.: PCT/US2009/055534
§ 371 (c)(1),
(2), (4) Date: Jan. 26, 2011

(87) PCT Pub. No.: WO2010/036482
PCT Pub. Date: Apr. 1, 2010

(65) Prior Publication Data
US 2011/0166840 A1 Jul. 7, 2011

Related U.S. Application Data

(60) Provisional application No. 61/099,839, filed on Sep. 24, 2008.

(51) Int. Cl.
*G06F 17/10* (2006.01)
*G01V 3/38* (2006.01)
*G01V 3/12* (2006.01)

(52) U.S. Cl.
CPC ... *G01V 3/38* (2013.01); *G01V 3/12* (2013.01)

(58) Field of Classification Search
CPC ......... G01V 3/38; G01V 3/12; G06F 17/5009
USPC ............................................................ 703/2
See application file for complete search history.

(56) References Cited

U.S. PATENT DOCUMENTS 5,862,513 A * 1/1999 Mezzatesta et al. .............. 702/9
6,603,313 B1 8/2003 Srnka (Continued)

FOREIGN PATENT DOCUMENTS

| WO | WO 2004/083898 | 9/2004 |
| WO | WO 2006/096328 | 9/2006 |
| WO | WO 2006/115622 | * 11/2006 |

OTHER PUBLICATIONS

Kurang Mehta et al., "Controlled source electromagnetic (CSEM) technique for detection and delineation of hydrocarbon reservoirs: an evaluation," 2005, SEG Expanded Abstracts, vol. 24, four pages.*

(Continued)

*Primary Examiner* — Kamini S Shah
*Assistant Examiner* — Russ Guill
(74) *Attorney, Agent, or Firm* — ExxonMoibl Upstream Research Company Law Dept.

(57) ABSTRACT

Systems and methods which provide electromagnetic subsurface mapping to derive information with respect to subsurface features whose sizes are near to or below the resolution of electromagnetic data characterizing the subsurface are shown. Embodiments operate to identify a region of interest (203) in a resistivity image generated (202) using electromagnetic data (201). One or more scenarios may be identified for the areas of interest, wherein the various scenarios comprise representations of features whose sizes are near to or below the resolution of the electromagnetic data (204). According to embodiments, the scenarios are evaluated (205), such as using forward or inverse modeling, to determine each scenarios' fit to the available data and further to determine their geologic reasonableness (206). Resulting scenarios may be utilized in a number of ways, such as to be substituted in a resistivity image for a corresponding region of anomalous resistivity for enhancing the resistivity image (207).

30 Claims, 4 Drawing Sheets

(56) References Cited

U.S. PATENT DOCUMENTS

| | | | |
|---|---|---|---|
| 6,628,119 | B1 | 9/2003 | Eidesmo et al. |
| 6,696,839 | B2 | 2/2004 | Ellingsrud et al. |
| 6,717,411 | B2 | 4/2004 | Ellingsrud et al. |
| 6,739,165 | B1 | 5/2004 | Strack |
| 6,859,038 | B2 | 2/2005 | Ellingsrud et al. |
| 6,950,747 | B2 | 9/2005 | Byerly |
| 6,999,880 | B2 | 2/2006 | Lee |
| 7,145,341 | B2 | 12/2006 | Ellingsrud et al. |
| 7,187,569 | B2 | 3/2007 | Sinha et al. |
| 7,191,063 | B2 | 3/2007 | Tompkins |
| RE39,844 | E | 9/2007 | Srnka |
| 7,356,412 | B2 | 4/2008 | Tompkins |
| 7,362,012 | B2 | 4/2008 | Godkin |
| RE40,321 | E | 5/2008 | Srnka |
| 7,542,851 | B2 | 6/2009 | Tompkins |
| 7,593,815 | B2 | 9/2009 | Willen et al. |
| 7,659,721 | B2 | 2/2010 | MacGregor et al. |
| 7,667,464 | B2 | 2/2010 | Campbell |
| 7,683,625 | B2 | 3/2010 | Milne et al. |
| 8,099,239 | B2 | 1/2012 | MacGregor et al. |
| 8,482,287 | B2 | 7/2013 | Tompkins |
| 2004/0099804 | A1* | 5/2004 | Liu et al. ............... 250/301 |
| 2006/0186887 | A1 | 8/2006 | Strack et al. |
| 2007/0177710 | A1* | 8/2007 | Karve et al. ............ 376/327 |
| 2007/0294036 | A1 | 12/2007 | Strack et al. |
| 2008/0071709 | A1 | 3/2008 | Strack |
| 2008/0136420 | A1 | 6/2008 | Velikhov et al. |
| 2008/0270028 | A1* | 10/2008 | Abubakar et al. ......... 702/2 |
| 2009/0005997 | A1 | 1/2009 | Willen |
| 2009/0037115 | A1* | 2/2009 | Magill et al. ............ 702/14 |
| 2009/0103395 | A1 | 4/2009 | Willen |
| 2009/0134877 | A1 | 5/2009 | Schaug-Petterson |
| 2009/0171587 | A1 | 7/2009 | Lu |
| 2009/0306895 | A1* | 12/2009 | MacGregor et al. ........ 702/6 |
| 2010/0332198 | A1 | 12/2010 | Wahrmund et al. |
| 2011/0098929 | A1* | 4/2011 | Tabanou et al. ........... 702/7 |

OTHER PUBLICATIONS

Lucy MacGregor et al., "Controlled-source electromagnetic imaging on the Nuggets-1 reservoir", 2006, The Leading Edge, vol. 25, pp. 984-992.*
Paolo Dell'Aversana et al., "Multidimensional Modeling and Inversion of marine CSEM data acquired with an expanded frequency spectrum," Jan. 14, 2008, 7th International Conference & Exposition on Petroleum Geophysics, five pages.*
Alexander G. Ramm et al., "Optimization methods in direct and inverse scattering," 2005, Continuous Optimization: Current Trends and Modern Applications, Springer, pp. 1-52.*
C.J. Ramananjaona et al., "Characterisation of anisotropic resistivity from marine CSEM data," Jun. 9, 2008, 70th EAGE Conference & Exhibition, five pages.*
Jiuping Chen et al., "3D inversion of magnetometric resistivity data," 2002, SEG International Exposition and 72nd Annual Meeting, four pages.*
Alumbaugh et al. (2006), "Two-Dimensional Inversion of Marine Electromagnetic Data Using Seismic Reflection Data as Apriori Information," 2006 AGU meeting, Abstract No. NS23A-03, 1 pg.
Carazzone, J.J. (1996), "Inversion of *P-SV* seismic data," *Geophysics* 51(5), pp. 1056-1068.
Carazzone, J.J. et al. (2005), "Three Dimensional Imaging of Marine CSEM Data," SEG/Houston 2005 Annual Meeting, pp. 575-579.
Chen, J. et al. (2007), "Effects of uncertainty in rock-physics models on reservoir parameter estimation using marine seismic AVA and CSEM data," SEG/San Antonio 2007 Meeting, pp. 457-461.
Constable, S. et al. (2006), "Mapping thin resistors and hydrocarbons with marine EM methods: Insights from ID modeling," *Geophysics* 71(2), pp. G43-G51.
Darnet, M. et al. (2007), "Detecting hydrocarbon reservoirs from CSEM data in complex settings: Application to deepwater Sabah, Malaysia," *Geophysics* 72(2), pp. WA97-WA103.
Ellingsrud, S. et al. (2002), "Remote sensing of hydrocarbon layers by seabed logging (SBL): Results from a cruise offshore Angola," *The Leading Edge*, pp. 972-982.
Frenkel, MA. (2006), "Iterative Multscale Deep-Resistively Imaging," OTC 18326, 2006 Offshore Technology Conf., 9 pgs.
Green, K.E. et al. (2005), "R3M Case Studies: Detecting Reservoir Resistivity in Complex Settings," SEG Annual Meeting Extended Abstracts, 4 pgs.
Harris, P. et al. (2007), "Enhancing the resolution of CSEM inversion using seismic constraints," SEG/San Antonio 2007 Annual Meeting, pp. 604-608.
Hohmann, G.W. et al. (1987), "Inversion of Controlled-Source Eleoromagnetic Data," Chpt. 8, Electromagnetic Methods in Applied Geriphysies—Theory 1, pp. 469-503.
Hou, Z. et al. (2006), "Reservoir-parameter identification using minimum relative entropy-based Bayesian inversion of seismic AVA and marine CSEM data," Geophysics 71(6), pp. O77-O88.
Hoversten, G.M. et al. (2006), "Direct reservoir parameter estimation using joint inversion of marine seismic AVA and CSEM data," *Geophysics* 71(3), pp. C1-C13.
Jing, C. et al, (2008), "CSEM inversion; Impact of anisotropy, data coverage, and initial models," XP-002563461, SEG Las Vegas 2008 Annual Meeting, pp. 604-608.
Jupp, D.L.B. et al. (1977), "Resolving Anisotropy in Layered Media by Joint Inversion," *Geophysical Prospecting* 25, pp. 460-470.
Løseth, L.O. et al. (2007), "Electromagnetic fields in planarly layered anistropic media," XP-002563460, *Gepphys. J. Int.* 170, pp. 44-80.
Lu, X. et al. (2007), "Understanding Anistropy in Marine CSEM Data," SEG/San Antonio 2007 Meeting, pp. 633-637.
MacGregor, L. et al. (2007), "Derisking exploration prospects using integrated seismic and electromagnetic data—a Falkland Islands case study," *The Leading Edge*, pp. 357-350.
Newman, G.A.e t al. (2000), "Three-dimerisionai magnetotelluric inversion using non-linear conjugate gradients," *Geophys. J. Int.* 140, pp. 410-424.
Squires, Li et al. (1992), "The effects of statics on tomographic velocity reconstructions," *Geophysics* 57(2), pp. 353-362.
Srnka, L. et al. (2006), "Remote reservoir resistivity mapping," *The Leading Edge*, pp. 972-975.
Stoffa, P.L. et al. (1991), "Nonlinear mai tiparameter optimization using genetic algorithms: Inversion of plane-wave suismowarris," *Geophysics* 56(1), pp. 1794-1810.
Symes, W.W. et al. (1991), "Velocity inversion by differential semblance optimization," *Geophysics* 56(5), pp. 654-663.
Tarantula, A. (1984), "Inversion of seismic reflection data in the acoustic approximation," *Geophysics* 49(8), pp. 1259-1266.
Um, E.S. et al, (2007), "On the physics at the marine cotia-olted-sounx electromagnetic method," *Geophysics* 72(2), pp. WA13-WA76.
European Search Report, dated Jan. 25, 2010, EP 09151954.6.
International Search Report and Written Opinion, dated Nov. 3, 2009, PCT/US2009/055534.

* cited by examiner

SYSTEMS AND METHODS FOR SUBSURFACE ELECTROMAGNETIC MAPPING

CROSS-REFERENCE TO RELATED APPLICATIONS

This application is the National Stage of International Application No. PCT/US2009/055534, that published as WO2010/036482, filed 31 Aug. 2009, which claims the benefit of U. S. Provisional Application No. 61/099,839, filed 24 Sep. 2008, each of which is incorporated herein by reference, in its entirety, for all purposes.

TECHNICAL FIELD

The invention relates generally to the field of geophysical prospecting and, more particularly, to mapping the subsurface using electromagnetic data.

BACKGROUND OF THE INVENTION

In geological exploration it is desirable to obtain information regarding the various formations and structures which exist beneath the Earth's surface. Accordingly, various techniques have been employed to identify subsurface structures, geological strata, and hydrocarbon reserves, etc., to determine density, porosity, and composition, etc. when searching for and/or developing hydrocarbon reserves.

For example, seismology has been used extensively for providing subsurface mapping, such as to produce two-dimensional (2D) or three-dimensional (3D) images. In implementing seismic data collection for subsurface mapping, a seismic source, typically producing waves in the five to sixty Hz range, introduces seismic energy into the subsurface and multiple seismic transducers collect seismic energy that is reflected and/or refracted by subsurface structure, features, etc. Although seismic data may be processed to provide a relatively good understanding of the subsurface down to a resolution of approximately ten meters (with typical velocities of rock), the technique is not without its disadvantages. For example, a very small amount of hydrocarbon (e.g., oil or gas) in a medium results in a very large change in the acoustic properties of that region, and thus seismic techniques often result in false indication of economic hydrocarbon volumes.

Various forms of well data, such as from well cuttings, well logging, well history, etc., have been used to provide subsurface mapping, such as may be limited to one-dimensional (1D) mapping in the case of the use of well cuttings and some well logging techniques, or as may provide 2D mapping in the case of some well logging techniques and well history. In implementing well data collection for subsurface mapping, data available from the drilling, completion, or operation of one or more boreholes penetrating the subsurface is collected and analyzed. Although such data may provide excellent information with respect to the subsurface actually penetrated by the borehole, the resulting mapping is typically limited in the extent, both vertically and horizontally, into which the subsurface may be mapped. For example, well cuttings typically only provide reliable mapping information for the area immediately adjacent to the borehole and well logging data often only provides reliable mapping information for an area approximately two to five meters beyond the borehole, and interpretation is required to extend mapping across the large area between wellbores. Although well history information may provide mapping information with respect to a reservoir in a general sense, detailed information such as boundaries and strata is generally not provided through well history information. Accordingly, an accurate understanding of a large area of the subsurface is currently not possible using such well data.

A more recently developed technique used for subsurface mapping is controlled-source electromagnetic (CSEM) surveying. CSEM surveying exploits the differences in resistivity of various subsurface media (e.g., rock formations, shale, sand, briny water, hydrocarbons, etc.) for providing subsurface mapping, such as to provide 2D or 3D images. Specific operational aspects, as an example, with respect to the use of CSEM data are provided in U.S. Pat. No. 6,603,313 to Srnka and World Intellectual Property Organization publication number WO 2004/083898 A1, the disclosures of which are hereby incorporated herein by reference.

In implementing CSEM data collection for subsurface mapping, an electromagnetic source, typically producing electromagnetic waves in the 0.01 Hz to 1 Hz range, introduces electromagnetic energy into the subsurface and multiple electromagnetic transducers collect electromagnetic energy that is reflected and/or refracted by subsurface structure, features, etc. Such electromagnetic data may be processed to identify regions of interest with respect to hydrocarbon reserves using the fact that hydrocarbon reservoirs are generally associated with higher resistivity levels than most sedimentary rocks present in the Earth's subsurface. Moreover, because the resistivity of subsurface media is not greatly affected by a small amount of hydrocarbon (e.g., oil or gas) in a medium, false hydrocarbon indicators from formations which contain small amounts of hydrocarbons but which do not include enough of the hydrocarbon (i.e. include enough to be an economically producible reservoir) can be avoided. However, due at least in part to the very low frequencies that are used in CSEM surveying, subsurface mapping provided by CSEM techniques often provides an understanding of the subsurface down to a resolution of approximately one hundred meters.

Although various techniques, such as the Sharp boundary inversion process (see e.g., Alumbaugh et al., "Two-Dimensional Inversion of Marine Electromagnetic Data Using Seismic Reflection Data as A Priori Information," see internet domain agu.org/meetings/fm06/fm06-sessions, 2006 AGU meeting, 11-15 Dec. 2006); the disclosure of which is hereby incorporated herein by reference), have been developed for use in sharpening various regions of resistivity in resistivity images, these techniques have primarily resulted in only sharpening the edges of the "clouds" representing the regions of resistivity in the resistivity images. For example, although such techniques may provide a sharper boundary between regions of resistivity, the techniques do not remove the ambiguity of where within the cloud any particular feature which may have been the source of the resistivity cloud is actually disposed. Due to the low resolution of CSEM survey data, and the near proximity of different strata in an electromagnetic sense, the regions of resistivity provided by currently available electromagnetic subsurface mapping techniques are quite large and very indeterminate (i.e., individual structures and features are hidden in a resistivity cloud).

BRIEF SUMMARY OF THE INVENTION

The present invention is directed to systems and methods which provide electromagnetic subsurface mapping to derive information with respect to subsurface features (e.g., potential hydrocarbon reservoirs, compartments within potential hydrocarbon reservoirs, non-reservoir compartments near hydrocarbon reservoirs, geologic bodies above, near, or below potential hydrocarbon reservoirs, or other objects, structures, etc. such that characterizing their resistivity is useful in properly characterizing the resistivities of potential hydrocarbon reservoirs) whose sizes are near to or below the resolution of electromagnetic data characterizing the subsurface. Accordingly, the present invention recognizes that one or more geologic feature(s), may be contributing to what otherwise appears to be a single resistivity anomaly. Although such features causing resistivity anomalies in a resistivity image are below the resolution of the electromagnetic data used to generate the resistivity image, analysis provided in accordance with the present invention provides an understanding of these features.

Certain embodiments of the invention operate to identify a region of interest in a resistivity image generated using electromagnetic data, such as may be provided through CSEM surveying of large subsurface areas. Thereafter, one or more resistivity scenarios (scenarios) may be generated or otherwise identified for the areas of interest, wherein the various scenarios include representations of one or more features whose sizes are near to or below the resolution of the electromagnetic data. The foregoing scenarios may be developed or selected using other, more detailed information than the electromagnetic data used to generate the resistivity image, such as that available from seismic data, well data, from a working knowledge of the physical properties and geometries of hydrocarbon reservoirs, etc. According to embodiments, the scenarios are evaluated, such as using forward or inverse modeling, to determine each scenarios' fit to the available data. Using the scenarios which are determined to provide a reasonable fit to the available data, the geologic reasonableness of the scenarios may be determined to identify one or more scenarios, providing information regarding objects or features whose sizes are near to or below the resolution of the electromagnetic data which may accurately represent the identified area of interest.

One or more embodiments of the invention may operate to repeat steps of identifying scenarios, evaluating the scenarios, and determining the geologic reasonableness of scenarios to identify one or more preferred scenarios for use in subsurface mapping. For example, where the geologic reasonableness of remaining scenarios is unlikely or less likely than desired (e.g. the scenarios are inconsistent with some of the data or particular data), other scenarios may be identified in an attempt to identify scenarios which fit the available data and possess a greater level of geologic reasonableness. Additionally or alternatively, scenarios may be identified in groups sharing a similar attribute, feature, or other commonality, evaluate the scenarios of one such group, determine the geologic reasonableness of the remaining scenarios, and identify one or more optimal candidate scenarios of that group, and then repeat the process for each remaining group of scenarios. After a plurality of groups of scenarios have been processed, the resulting candidate scenarios may be analyzed to identify one or more scenarios, providing information regarding objects or features whose sizes are near to or below the resolution of the electromagnetic data which may accurately represent the identified area of interest.

Scenarios identified as providing information regarding objects or features whose sizes are near to or below the resolution of the electromagnetic data which may more closely represent the identified area of interest may be utilized in a number of different approaches. For example, one or more scenarios may be substituted in a resistivity image for a corresponding region of anomalous resistivity for enhancing the resistivity image, such as for engineering analysis, economic analysis, planning, etc. A particular scenario selected for substitution, where multiple scenarios are identified, may be selected based upon the particular use to which the resistivity image is to be put to, the type or quality of information utilized in initially deriving the scenario, other available information, etc.

The resulting resistivity images of embodiments of the present invention provide electromagnetic subsurface mapping of resistivity features which are consistent with the lower-resolution resistivity images produced from the electromagnetic data, but whose sizes are near to or below the resolution of the electromagnetic data. Thus, such resistivity images provide an understanding of these features in electromagnetic subsurface mapping heretofore not available using electromagnetic data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
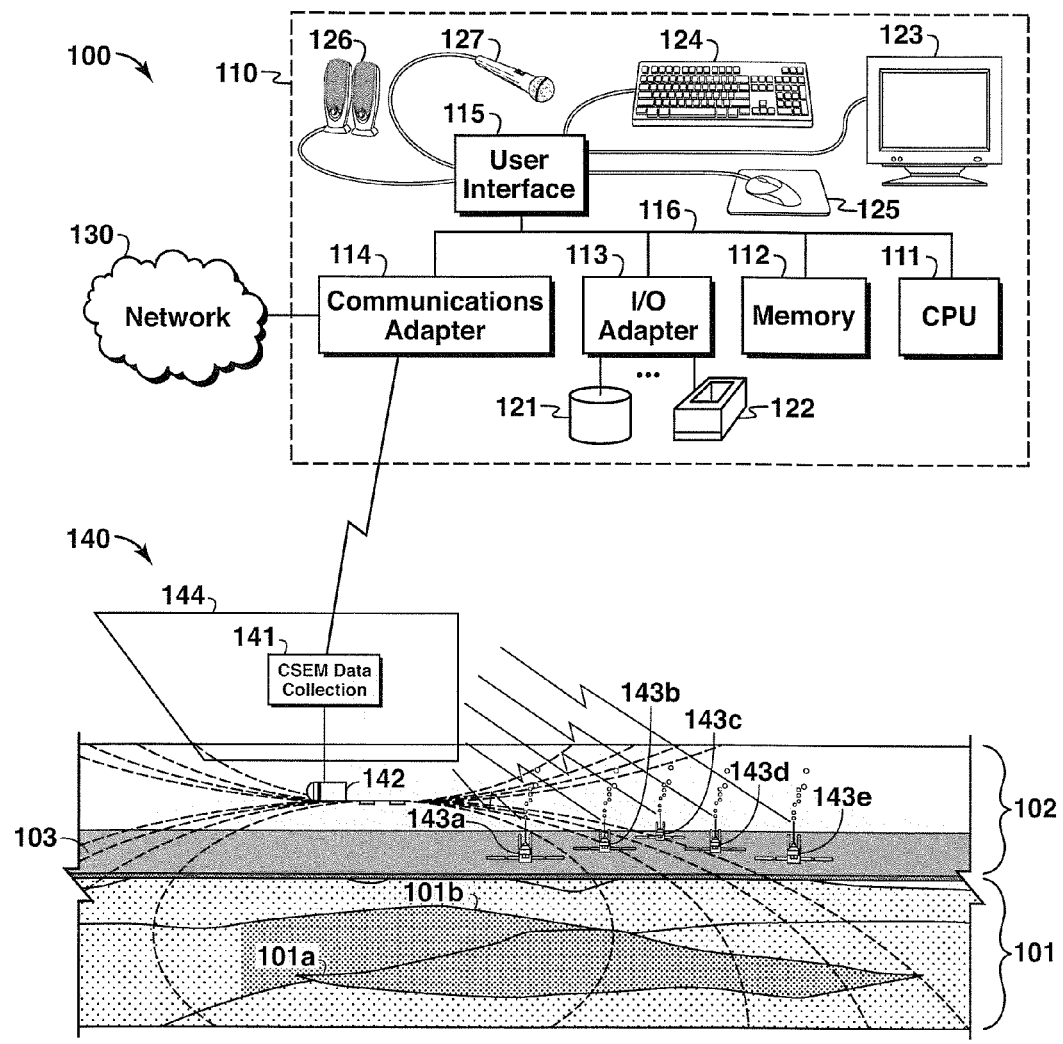
FIG. 1 shows a system adapted to provide electromagnetic subsurface mapping according to embodiments of the present invention.

Directing attention to FIG. 1, system 100 is adapted to provide electromagnetic subsurface mapping to derive information with respect to subsurface features (e.g., objects, structures, etc.) whose sizes are near to or below the resolution of electromagnetic data characterizing the subsurface according to certain embodiments of the invention. In operation according to an embodiment of the invention, system 100 is used to generate and evaluate the geologic reasonableness of CSEM resistivity scenario models containing one or more subsurface bodies to provide electromagnetic subsurface mapping of resistivity features which are consistent with the lower-resolution resistivity images produced from the electromagnetic data, but whose sizes are near to or below the resolution of the electromagnetic data, and in some cases consistent with the higher resolution of seismic data. Some embodiments of the invention may utilize operator input and/or analysis for various aspects, such as in making or confirming geologic reasonableness interpretation and/or determination.

System 100 of the illustrated embodiment includes processor-based system 110 (e.g., computer system) and electromagnetic survey system 140. Processor-based system 110 and electromagnetic survey system 140 cooperate to generate a resistivity image, such as a volumetric 3D image, of subsurface area 101, such as may include an area of suspected hydrocarbon reserves below sea 102. The subsurface areas 101a and 101b represent different materials (e.g, shale, sand, or other material) within the subsurface area 101.

Electromagnetic survey system 140 of the illustrated embodiment includes survey vessel 144, electromagnetic source 142, electromagnetic transducers 143a-143e, and CSEM data collection system 141. Survey vessel 144 may be any suitable vessel that accommodates electromagnetic source 142 and CSEM data collection system 141. The survey vessel 144 may also be used to provide power to the electromagnetic source 142 and/or CSEM data collection system 141. Electromagnetic source 142 may include a deep-towed controlled source operable to emit electromagnetic energy designed to reach subsurface area 101 to be surveyed below the floor of sea 102. Electromagnetic transducers 143a-143e may include an array of highly sensitive sensors deployed on the floor of sea 102, which may be at depths up to three miles (4,800 m), to collect the electromagnetic signals as reflected and/or refracted by subsurface media. Although the illustrated embodiment shows electromagnetic transducers 143-143e deployed on the floor of sea 102, such electromagnetic transducers may be utilized on land, in the subsurface, or even coupled to a vessel, such as survey vessel 144, etc. Moreover, it should be appreciated that electromagnetic transducers in numbers and in deployment patterns other than that illustrated may be utilized.

The electromagnetic signals sampled (acquired) by electromagnetic transducers 143a-143e are provided to CSEM data collection system 141 of the illustrated embodiment to provide measurements of electromagnetic data characteristic of the Earth's subsurface resistivity. These may be provided to the CSEM data collection system 141 via removal of memory from the electromagnetic transducers 143a-143e, communication with the electromagnetic transducers 143a-143e or other suitable methods. CSEM data collection system 141 of embodiments comprises a processor-based system, such as described below with respect to processor-based system 110. CSEM data collection system 141 may be operable to control electromagnetic source 142, to collect sampled electromagnetic signals from electromagnetic transducers 143a-143e, and to process the sampled signals to provide desired measurements of electromagnetic data characteristics of the subsurface resistivity.

Processor-based system 110 of the illustrated embodiment includes central processing unit (CPU) 111 coupled to system bus 116. CPU 111 may be any of a number of general purpose CPUs, such as processors from the PENTIUM family of processors available from Intel Corporation, processors from the XEON family of processors available from Intel Corporation, processors from the POWERPC family of processors available from the AIM alliance (Apple Inc., International Business Machines Corporation, and Motorola Inc.), or processors from the OPTERON family of processors available from Advanced Micro Devices, Inc. It should be appreciated that the present invention is not restricted by any particular processor architecture. Moreover, although a single processor is shown in the illustrated embodiment of processor-based system 110, processor based systems as may be utilized may include multiple processors, such as in a parallel processing configuration, distributed processing configuration, co-processor configuration, etc.

Bus 116 of the illustrated embodiment is coupled to memory 112, such as may comprise static random access memory (SRAM), dynamic random access memory (DRAM), synchronous dynamic random access memory (SDRAM), flash memory, read only memory (ROM), programmable read only memory (PROM), erasable programmable read only memory (EPROM), electrically erasable programmable read only memory (EEPROM), and/or the like. Memory 112 holds user and system data and programs as is well known in the art. Bus 116 of the illustrated embodiment is also coupled to input/output (I/O) adapter 113, communications adapter 114, and user interface adapter 115.

I/O adaptor 113 connects to storage device 121, such as may comprise one or more of a hard disk, an optical disk (e.g., compact disk (CD) or digital versatile disk (DVD)), a floppy disk, a tape, and/or the like, to the processor-based system. I/O adaptor 113 of the illustrated embodiment is also connected to printer 122, which enables the system to print information such as reports, images, etc. Such a printer may be a traditional printer (e.g. dot matrix, laser, etc.), a fax machine, a copy machine, and/or the like.

Communications adapter 114 is adapted to couple processor-based system 110 to various systems, such as C SEM data collection system 141, network 130, and/or the like to provide communications to and/or from such systems, devices, networks, etc. Network 130 and/or the link between communications adapter 114 and CSEM data collection system 141 may comprise the public switched telephone network (PSTN), a local area network (LAN), a metropolitan area network (MAN), a wide area network (WAN), an extranet, an intranet, the Internet, a cellular network, a cable transmission network, and/or the like.

User interface adapter 115 of the illustrated embodiment couples various user input devices to the processor-based system. For example, keyboard 124, pointing device 125, and microphone 127 may be coupled through user interface adapter 115 to accept various forms of user input. Similarly, display 123 and speaker 126 may be coupled through user interface adapter to provide user interface output. Accordingly, CPU 111 may control display of various information, including text, graphics, and images upon display 123. Display 123 may comprise a cathode ray tube (CRT) display, a plasma display, a liquid crystal display (LCD), a projector, and/or the like. Although not expressly shown in the illustrated embodiment, display 123 may provide for input of data as well as output of data. For example, display 123 may comprise a touch screen display.

It should be appreciated that elements of embodiments of the present invention may be implemented in software, such as code segments operable upon one or more processor-based systems such as processor-based system 111 and CSEM data collection system 141, to perform the functions described herein. The program or code segments can be stored in a computer readable medium, such as memory 112 and/or storage device 121. Additionally or alternatively, the code segments may be downloaded via computer networks, such as network 130.

Processor-based system 110 preferably communicates with CSEM data collection system 141 or otherwise obtains data regarding measurements of electromagnetic data characteristics of the subsurface resistivity therefrom. This data may be stored by processor-based system 110, such as in memory 112 and/or storage device 121. Although an exemplary configuration of processor-based system 110 and electromagnetic survey system 140 have been shown to facilitate an understanding of the concepts of the present invention, it should be appreciated that various other configurations of processor-based system 110 and electromagnetic survey system 140 may be utilized as should be appreciated by those of skill in the art. For example, processor-based system 110 may comprise a distributed system. Additionally or alternatively, electromagnetic survey system 140 may comprise a stationary (e.g., non-vessel based) or land based system of course, other configurations are also within the scope of the present invention. Regardless of the specific configuration of processor-based system 110 and electromagnetic survey system 140, operating under control of an instruction set or instruction sets defining functional operation as described herein, embodiments of processor-based system 110 and/or electromagnetic survey system 140 utilize the data regarding measurements of electromagnetic data characteristics of the subsurface resistivity to generate one or more resistivity images or modules of the subsurface. Such resistivity images are used to identify at least one region of anomalous resistivity within the subsurface. For example, a resistivity image may be displayed on display 123 for identification or confirmation of one or more regions of anomalous resistivity, such as through user manipulation of pointing device 125, a user interfacing with a touch screen feature of display 123, etc. Additionally or alternatively, algorithms of processor-based system 110 may identify regions of anomalous resistivity, such as by identifying areas having a particular or threshold resistivity, areas having a particular or threshold difference in resistivity (e.g. resistivity within a specific range) as compared to surrounding regions, areas having a particular or threshold resistivity gradient, areas having a particular or threshold resistivity anisotropy, etc.

In operation according to certain embodiments of the invention, at least one resistivity scenario model (e.g., a model having proposed or predicted value for a region of anomalous resistivity and/or input parameters) or "scenario" is generated for a region of anomalous resistivity, wherein the scenario revises the region of anomalous resistivity to comprise a background or nominal resistivity plus one or more smaller regions of increased or decreased resistivity. Such scenarios may be derived using data in addition to that of the data regarding measurements of electromagnetic data characteristics of the subsurface resistivity, such as may be stored in memory 112 and/or storage device 121, and/or as may be available from external sources such as via network 130. Such additional data may comprise more detailed information than the electromagnetic data used to generate the resistivity image, which may be provided from seismic data, well data, from a working knowledge of the physical properties and geometries of hydrocarbon reservoirs, etc. It should be appreciated, however, that in some cases electromagnetic subsurface mapping reveal resistive anomalies in locations where seismic or other data had not been previously detected or postulated anomalies. Accordingly, the use of other data is not intended to supplant information provided by electromagnetic data.

Algorithms of processor-based system 110 operate to evaluate the foregoing scenario(s). For example, forward and/or inverse modeling with respect to scenarios may be utilized to determine if the scenarios fit the available data, and thus present a potentially valid representation of the corresponding region of anomalous resistivity. The geologic reasonableness of scenarios may be determined. For example, algorithms of processor-based system 110 may operate to analyze attributes, such as structural and stratigraphic relationships geologic consistency, resistivity fit to structure and stratigraphy, etc., of scenarios to determine if such scenarios are reasonable in a geologic sense. For example, a scenario may be determined to be geologically unreasonable as possessing one or more attributes which heretofore have not been found in nature. Likewise, a scenario may be determined to be geologically unreasonable as possessing one or more attributes which are unlikely or inconsistent with the subsurface area being surveyed.

Figure 2:
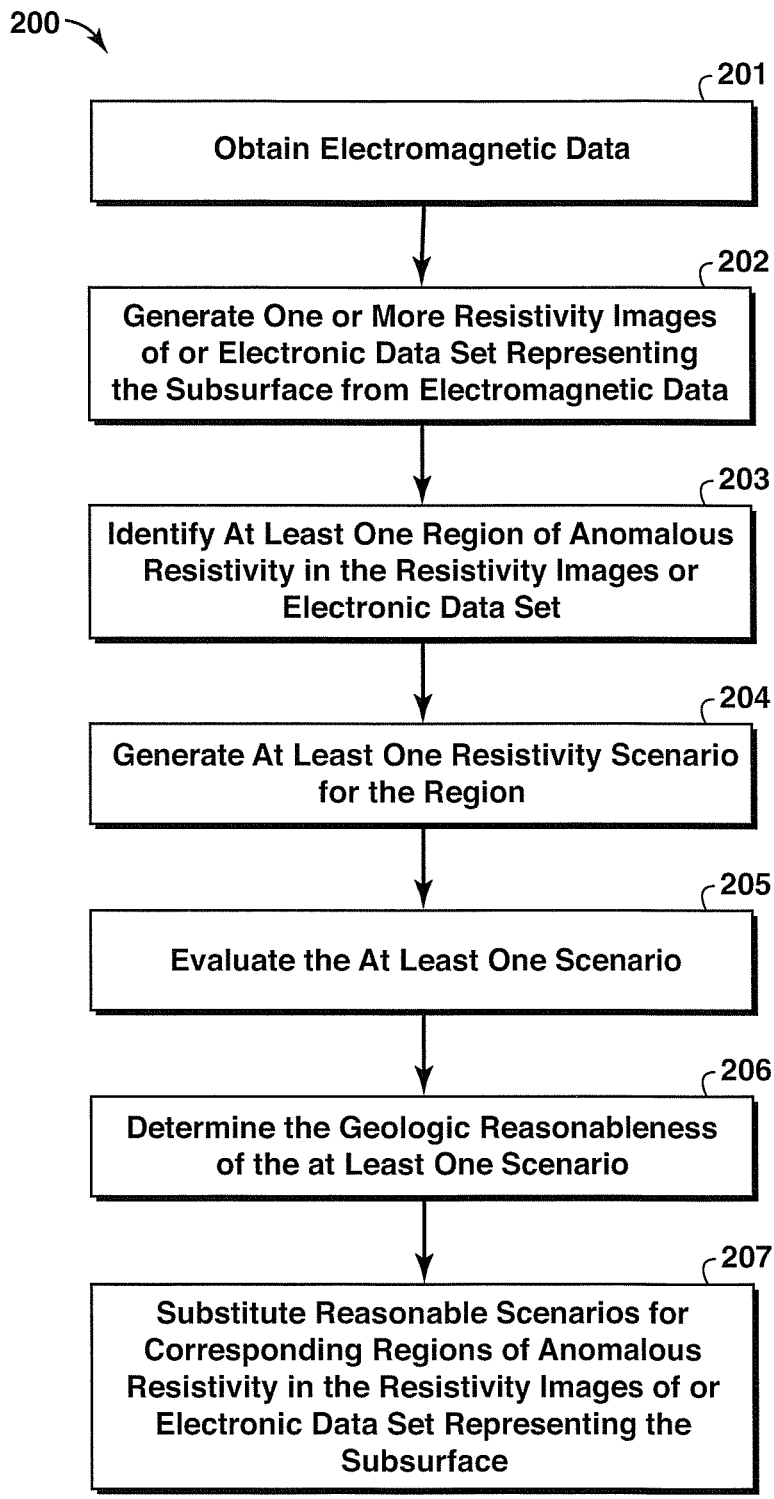
FIG. 2 shows a flow chart of operation to provide electromagnetic subsurface mapping according to embodiments of the present invention.

Scenarios determined to be a potentially valid representation of the corresponding region of anomalous resistivity and which are geologically reasonable may be substituted for a corresponding region of anomalous resistivity. The resulting resistivity images provide electromagnetic subsurface mapping of resistivity features which are consistent with the lower-resolution resistivity images produced from the electromagnetic data, but whose sizes are near to or below the resolution of the electromagnetic data. FIG. 2 shows a flow diagram of operation to provide electromagnetic subsurface mapping to derive information with respect to subsurface features whose sizes are near to or below the resolution of electromagnetic data characterizing the subsurface according to embodiments of the invention. The steps shown in flow diagram 200 of FIG. 2 may be performed using system 100 of FIG. 1, if desired.

At block 201 of the illustrated embodiment, electromagnetic data from a survey is obtained. This electromagnetic data may be obtained from CSEM data collection system 141 of FIG. 1. For example, as electromagnetic source 142 is towed near the seafloor, within range of electromagnetic transducers 143a-143e, electromagnetic source 142 may broadcast low-frequency electromagnetic waves (e.g., in the range of 0.01-1 Hz) which penetrate seafloor 103, propagate through the subsurface media, and which are reflected, refracted, absorbed, etc. by subsurface features. The broadcast electromagnetic energy is absorbed, reflected, refracted, or otherwise affected to a lesser or greater extent depending on the medium they travel through, which translates into changes in the signal's amplitude, phase, direction, etc. Electromagnetic transducers 143a-143e record or sample the electromagnetic signals which have propagated through the subsurface media at various locations on the seafloor and provide this electromagnetic data to CSEM data collection system 141. CSEM data collection system 141 may provide signal processing with respect to the sampled electromagnetic signals, such as to provide filtering, amplification, digitization, etc.

One or more resistivity images are generated using the electromagnetic data according to the illustrated embodiment at block 202. For example, processor-based system 110 may obtain the electromagnetic data from CSEM data collection system 141 and process the electromagnetic data to generate a resistivity image of the subsurface. It should be appreciated that the Earth may be equivalently characterized by resistivity or its inverse, electrical conductivity. Inversion and/or forward modeling techniques may be used to form resistivity images from the electromagnetic data.

For example, frequency-domain inversion may be used to infer resistivity values from electromagnetic data. Detail with respect to techniques for providing frequency-domain inversion are provided in J. J. Carazzone et al., 2005, Three Dimensional Imaging of Marine CSEM Data, Expanded Abstracts, 75th Annual International meeting, Society of Exploration Geophysicists and L. MacGregor, et al., 2007, Derisking exploration prospects using integrated seismic and electromagnetic data—a Falkland Islands case study, The Leading Edge, 26, pp. 356-359, 2007, each of which is hereby incorporated herein by reference. Such a frequency-domain inversion technique is useful because it produces resistivity representations of the subsurface consistent with measured data, generally amplitude and phase of one or more measured components of the electric field at one or more frequencies for an array of receivers. 1D, 2D, and 3D inversions of Maxwell's equations may be utilized to generate 1D resistivity profiles, 2D resistivity swaths, and/or 3D resistivity volumes respectively. In some instances, it may be desirable to obtain and incorporate measurements of the CSEM magnetic fields as well as natural-source electromagnetic data, such as magnetotelluric data, in the inversion together with the CSEM data. Detail with respect to the inversion of magnetotelluric data is provided by, for example, G. Newman and D. Alumbaugh, 2000, Three-dimensional magnetotelluric inversion using non-linear conjugate gradients, Geophysical Journal International, 140, pp. 410-424, which is hereby incorporated herein by reference.

Likewise, a number of seismic forward and inverse modeling techniques are available for determining density and either velocities or moduli from seismic data. Detail with respect to such techniques is provided, for example, by A. Tarantola, "Inversion of seismic reflection data in the acoustic approximation", Geophysics, 49, pp. 1259-1266 (1984); J. Carazzone, "Inversion of P-SV seismic data", Geophysics, 51, pp. 1056-1068 (1986); W. Symes and J. Carazzone, "Velocity inversion by differential semblance optimization", Geophysics, 56, pp. 654-663 (1991); Squires et al, "The effects of statics on tomographic velocity reconstructions", Geophysics, 57, pp. 353-363 (1992); and, P. Stoffa and M. Sen, "Nonlinear multiparameter optimization using genetic algorithms: Inversion of plane-wave seismograms", Geophysics, 56, pp. 1794-1810 (1991), each of which is hereby incorporated herein by reference. Resistivity images derived from electromagnetic data may be utilized to initialize and constrain such forward and inverse seismic modeling techniques.

Techniques for the joint inversion of electromagnetic and other data, such as seismic geophysical data, may be utilized. Such techniques are described, for example, in Hou et al, "Reservoir-parameter identification using minimum relative entropy-based Bayesian inversion of seismic AVA and marine CSEM data", Geophysics, 71, pp. O77-O88 (2006), Hoversten et al, "Direct reservoir parameter estimation using joint inversion of marine seismic AVA and CSEM data", Geophysics, 71, pp. C1-C13 (2006), and J. Chen and T. Dickens, "Effects of uncertainty in rock-physics models on reservoir parameter estimation using marine seismic AVA and CSEM data", Abstracts of the 77th Annual International Meeting, Society of Exploration Geophysicists, pp. 457-461 (2007), each of which is hereby incorporated herein by reference.

The resistivity of the Earth is most generally anisotropic. That is, the ratio of electric field to applied current depends both on the direction of the current and on the direction of the field. The impact of anisotropy on CSEM and magnetotelluric data has been discussed by, for example, by D. Jupp and K. Vozoff, 1977, Resolving anisotropy in layered media by joint inversion: Geophysical Prospecting, 25, 460-470 and by X. Lu, and C. Xia, 2007, Understanding anisotropy in marine CSEM data: 77th Annual International Meeting, Society of Exploration Geophysicists, Expanded Abstracts, 633-637, each of which is hereby incorporated herein by reference. The inversion of electromagnetic data for anisotropic resistivities has been discussed by C. Jing et al, 2008, CSEM inversion: impact of anisotropy, data coverage, and initial models, 78$^{th}$ Annual International Meeting, Society of Exploration Geophysicists, Expanded Abstracts, which is hereby incorporated herein by reference.

When utilizing inversion techniques to generate resistivity images, such inversion techniques may be implemented with the assumption that there is at least a two-dimensional anisotropy in the subsurface media. Accordingly, it is assumed that there are bedding parallel current paths and bedding orthogonal current paths. Embodiments apply the foregoing two parameters of this anisotropic assumption with respect to the subsurface, such as through the use of an anisotropic VTI (vertically transverse isotropic) model having horizontal and vertical resistivity in the inversion code. The use of such an anisotropic inversion technique provides resistivity "clouds" in a generated resistivity image which are properly disposed and provide the proper bulk properties to be represented in a finer scaled model according to certain embodiments of the present invention.

Irrespective of the particular techniques utilized to generate resistivity images at block 202, resistivity images represent the Earth's resistivity in three dimensions at a resolution of the electromagnetic data (e.g., between 100 and 1000 meters, wherein the resistivity image comprises 1000s of square meters). The generated images may include derived quantities and alternate parameterizations of the Earth resistivity, such as the ratio of vertical to horizontal resistivity, and/or boundary enhancement parameterizations, such as derivatives.

Embodiments providing resistivity images which characterize the subsurface in 3D cells of resistivity, facilitate the solution of Maxwell's equations of electromagnetism by finite differences, such as for use in determining geologic reasonableness of features which are consistent with the lower-resolution resistivity images produced from the electromagnetic data, but whose sizes are near to or below the resolution of the electromagnetic data as discussed in further detail below. Alternative embodiments of the invention may generate resistivity images from less rigorous technologies, including forward modeling, 2D inverted resistivity sections, or 2.5D inverted resistivity swaths. However, such resistivity images typically have a poorer or less accurate fit to the subsurface and thus it is typically more difficult to determine geologic reasonableness of features which are consistent with the lower-resolution resistivity images produced from the electromagnetic data, but whose sizes are near to or below the resolution of the electromagnetic data.

Figure 3:
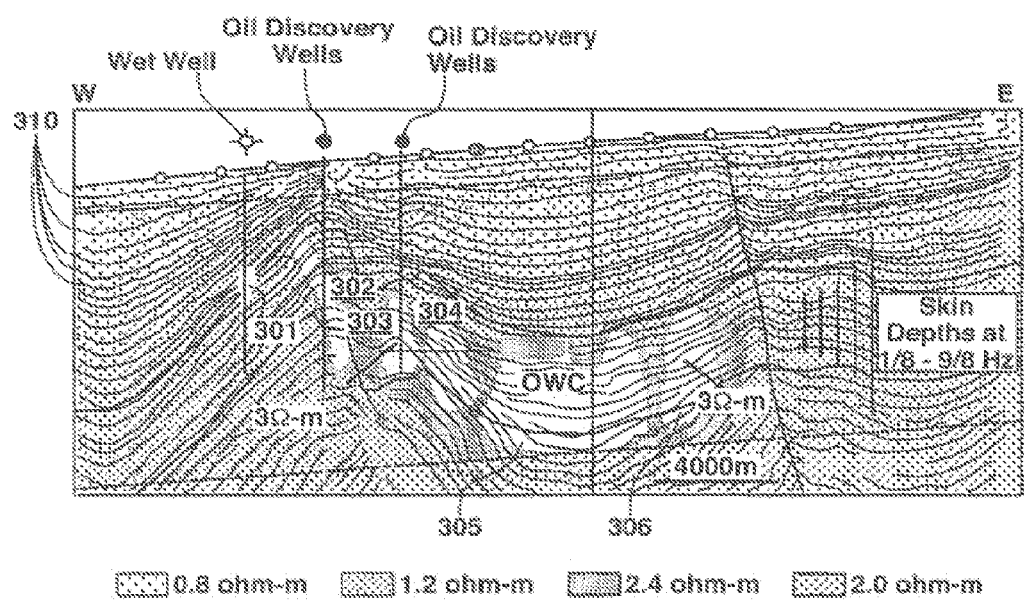
FIG. 3 shows a cross-sectional view of a resistivity image volume useful according to embodiments of the present invention.

FIG. 3 illustrates a portion of one such resistivity image of a subsurface region. It should be appreciated that to simplify the illustration herein FIG. 3 presents a cross-sectional view of a 3D resistivity image, wherein areas of different resistivity in the subsurface are represented as cloud-like structures (e.g., structures 301-306). Information or interpretations derived from other data types (e.g., seismic data, seismic velocities, well data, etc.) can additionally be used in generating the resistivity image. For example, bands 310 of substantially parallel lines shown in FIG. 3 represent seismic data showing subsurface strata.

Because resistivity images are derived from electromagnetic data, the cloud-like structures representing subsurface features are in electromagnetic resolution (electromagnetic resolution is the ability to differentiate between models using electromagnetic measurements). Electromagnetic wavelengths are generally ten times longer than seismic wavelengths, and thus electromagnetic resolution is generally much poorer than seismic resolution (the ability to differentiate between models using seismic measurements, wherein seismic resolution is a function of the size and depth of the features, and the density and wavelengths of the seismic data used in the measurements), particularly in a vertical sense. Diffuse resistivity anomalies can be as large as ¼ to ½ of a skin depth (where the amplitude diminishes by 1/e, where e is a transcendental constant valued at 2.718281828459045...) vertically, that is 250 meter (m) to 500 m for a 1 kilometer (km) skin depth, and as large as ⅛ to ¼th of a skin depth laterally, that is 125 m to 250 m for a 1 km skin depth. The dimensions of vertical skin depths from ⅝ to ⅛ Hz are shown on the right side of FIG. 3.

For example, when inversion is used to analyze electromagnetic data, thin (e.g., tens of meters thick), moderately resistive bodies (e.g., within a range of 20 ohm-meter (Ωm) to 200 Ωm, such as hydrocarbon reservoirs or carbonate build-ups in the Earth, often appear in the resulting resistivity image as vertically diffuse (e.g., hundreds of meters thick), slightly resistive (e.g., within a range of 2 Ωm to 20 Ωm) bodies (see e.g., areas 301-306 of FIG. 3) with a somewhat ambiguous correspondence to the actual bodies. This is due in part to the low temporal frequencies used in CSEM surveying to penetrate significant distances into the Earth and the resulting limited vertical and spatial resolution. Because of this inherent low resolution, unbiased electromagnetic inversion algorithms do not produce resistivity images with sharp boundaries, as shown in FIG. 3. Further limitations on resolution arise from the fact that the measured data are limited by background noises and are limited in areal coverage by cost and time considerations.

The size of the clouds representing resistive bodies in the resistivity images presents problems for users. For example, a reservoir engineer may desire to know not that a best productive reservoir is somewhere within a cloud, but rather where within that could the potentially productive reservoir is, how many reservoir levels there are, etc. Accordingly, as will be appreciated from the discussion which follows, operation according to flow diagram 200 of FIG. 2 derives information with respect to subsurface features whose sizes are near to or below the resolution of electromagnetic data characterizing the subsurface to provide an understanding of these features in electromagnetic subsurface mapping heretofore not available using electromagnetic data. It should be appreciated that resolution decreases with depth in both seismic and CSEM data due to the absorption of higher frequency signals by the Earth, thus resolving detail is more difficult with increasing depth for both technologies.

At block 203 of the illustrated embodiment, the resistivity image is analyzed to identify at least one region of anomalous resistivity about which more detail is desired (e.g., a particular cloud representing resistive bodies is identified within the resistivity image). Such a region may, for example, be where the presence of a hydrocarbon reservoir is suspected or hypothesized. For example, regions associated with a hydrocarbon reservoirs are generally more resistive than their surroundings, as this is the most common case for hydrocarbon reservoirs in clastic settings (e.g., such an anomalous region may be twice as resistive to four times as resistive as the background).

Although a region of anomalous resistivity of interest may typically be more resistive than its surroundings, the resistivity contrast associated with regions of anomalous resistivity may be less resistive than its surroundings in some cases. For example, hydrocarbon reservoirs in carbonate rocks may be less resistive than the surrounding, background carbonate rocks and hydrocarbon reservoirs in basins with significant amounts of salt may exhibit relatively small contrasts with respect to the surrounding elastic sediments.

Regions of anomalous resistivity may be identified through user input, computer analysis, and combinations thereof, such as by identifying areas having particular attributes. For example, the expected resistivities in the target and surrounding rock may be determined for use by a user and/or computer algorithm in identifying regions of anomalous resistivity. The expected resistivities in the target and surrounding rock may be determined using resistivity values from nearby or analog wells, interpretation from seismic, gravity, and/or other geophysical data, geologic inference, or physical property modeling. Using such expected resistivity information, a region of anomalous resistivity may be identified as a region having a particular threshold horizontal resistivity (e.g., at least 2.5 Ωm) and/or a particular threshold vertical resistivity (e.g., at least 3 Ωm). Anomalies of interest for hydrocarbon exploration may additionally or alternatively be identified on the basis of other geological and geophysical information, such as depth of burial, seismic reflectivity, seismic amplitude-versus-offset or amplitude-versus-angle, shape, and attitude relative to other geologic structures. For example, a region identified as a region of anomalous resistivity may be identified where seismic and resistivity data are consistent with potential trapping of mature, economic hydrocarbons in producible reservoir rock.

It should be appreciated that, because subsurface resistivity anomalies are so diffuse, regions of anomalous resistivity often represent multiple resistive bodies, some of which are not hypothesized to be hydrocarbon reservoirs. For example, hydrocarbon reservoirs may be below, adjacent to, or above resistive salt, carbonates, volcanics, and/or basement. Because the shallow resistivity structure typically impacts deeper resistivity structure in resistivity images derived from electromagnetic data, some regions of anomalous resistivity for which more detail may be desired may be above or beside potential hydrocarbon targets, rather than themselves potentially containing hydrocarbon targets.

Although the foregoing discussion makes reference to identifying one or more regions of anomalous resistivity in a generated resistivity image, it should be appreciated that embodiments of the present invention may not display or even generate a visual image. That is, a resistivity image may provide electromagnetic subsurface mapping as an electronic data set from which the aforementioned regions of anomalous resistivity are identified, such as by computer analysis. Of course, where user input is utilized to identify or to aid in identifying regions of anomalous resistivity, it may be desirable to present a visual, graphical representation of the foregoing electromagnetic subsurface mapping. In the claims, the term "resistivity image" will be deemed to include the resistivity data in the corresponding electronic data set.

A region of anomalous resistivity identified at block 203 is mapped in three dimensions (3D) in one or more resistivity volumes derived from the electromagnetic data. That is, 3D sub-volumes associated with the identified regions of anomalous resistivity are defined based on one or more resistivity image volumes. For example, a resistivity sub-volume for an identified region of anomalous resistivity may be formed from an area in which all attribute values (e.g., resistivity values) are greater than a threshold attribute value. Additionally or alternatively, resistivity sub-volumes for identified regions of anomalous resistivity may be defined based on more than one volume, such as a resistivity and seismic volume, or vertical and horizontal resistivity volumes. Commercial software used for geophysical analysis, such as the GOCAD product available from Earth Decision, Houston, Tex., VOXELGEO product available from Paradigm B.V., Amsterdam, The Netherlands, and PETREL product available from Schlumbeger, Sugerland, Tex., may be used to facilitate defining sub-volumes associated with identified regions of anomalous resistivity.

The foregoing identified regions of anomalous resistivity may represent one or more subsurface features whose sizes are near to or below the resolution of the electromagnetic data. It may be assumed that only a single, thin feature, such as a single, resistive, hydrocarbon reservoir, is present in a region of anomalous resistivity. Such a single feature can be correlated to a "diffuse resistive body" of approximately equivalent depth and reasonable "scaled" resistivities based on characteristics such as seismically-defined vertical and lateral position, seismic geometry, and seismic amplitude character, wherein the diffuse resistive body is one which gives approximately the same electromagnetic response as the single, thin feature. The resistivity and/or thickness of such a single feature (e.g., resistive hydrocarbon reservoir) can be estimated by scaling the resistivity thickness product (e.g., the vertical resistivity integrated over the vertical extent of the region of interest for one or more horizontal and/or vertical resistivities, the transverse resistivity integrated over the lateral extent of the region of interest for one or more horizontal and/or vertical resistivities, the volume-averaged resistivity anisotropy between one or more horizontal and/or vertical restivities, etc.), or transverse resistivity, of the diffuse resistive body to that of the thin feature using equations for conservation of resistive thickness, $t_1*\rho_1=t_2*\rho_2$ (see e.g., P. Harris, and L. MacGregor, 2007, Enhancing the resolution of CSEM inversion using seismic constraints, Expanded abstracts, 77th Annual International meeting, Society of Exploration Geophysicists, which is hereby incorporated herein by reference). However, the assumption that a region of anomalous resistivity represents only a single, thin feature fails to consider that many different reservoir-scale resistivity structures can be consistent with the lower-resolution resistivity images.

Accordingly, at block 204 of the illustrated embodiment one or more scenarios are generated or otherwise identified to be substituted for identified regions of anomalous resistivity. Such scenarios include representations of one or more features whose sizes are near to or below the resolution of the electromagnetic data. Accordingly, scenarios of embodiments are built as 3D resistivity scenario models such that the initial resistivity model of an identified region of anomalous resistivity can be substituted with an "equivalent" geologic scenario. For example, a scenario may be a representation of the Earth's resistivity corresponding to an identified region of anomalous resistivity identified at block 203 having the diffuse, anomalous resistivity cloud replaced by smaller, more compact structures with altered resistivity values (e.g., if a region of anomalous resistivity is a 1 km thick and found to be 3 Ωm more resistive than the background, the product of 3 Ωm*1 km, 3,000 Ωm (i.e., the resistivity thickness product), is the target resistivity for all scenarios for that identified region).

According to embodiments, one or more features in the scenario (e.g., those representing reservoirs or other bodies more resistive than background) have values of resistivity increased from those in the diffuse region of anomalous resistivity, while other portions of the scenario (e.g., those representing shale or other background lithologies) have values of resistivity decreased from those in the diffuse region of anomalous resistivity. Accordingly, in deriving a scenario the resistivity thickness product for the scenario is consistent with or within an experience-based scale factor of (e.g., within a threshold range allowing non-material variation, such as ±10%) the resistivity thickness product for the corresponding region of anomalous resistivity.

Figure 4A:
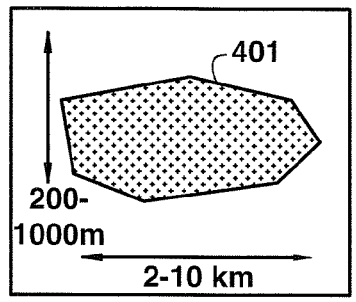
FIGS. 4A-4C show a region of anomalous resistivity and alternative scenarios therefore according to embodiments of the present invention.
Figure 4B:
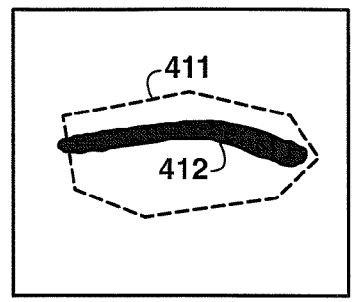
Figure 4C:
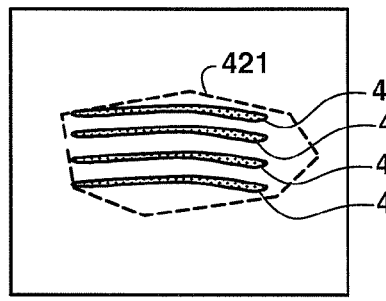

FIGS. 4A-4C and 5A-5C illustrate the correspondence between identified regions of anomalous resistivity and scenarios in accordance with certain embodiments of the invention. For example, FIG. 4A shows a 5 Ωm region of anomalous resistivity 401 with vertical dimensions ranging from 200 m to 1000 m and horizontal dimensions ranging from 2 km to 10 km in a 2 Ωm background. FIGS. 4B and 4C show two different subsurface scenarios which could be generated for the 5 Ωm region of anomalous resistivity 401. Specifically, FIG. 4B shows scenario 411 having 18 Ωm portion 412 (such as may correspond to reservoirs, material structure, or other non-background feature) which is 20 m to 100 m thick and the other portions of scenario 411 being 2 Ωm. FIG. 4C shows scenario 421 having four 9 Ωm portions 422-425 (such as may correspond to a reservoir, material structure, or other non-background feature) which are 5 m to 50 m thick and the other portions of scenario 421 being 2 Ωm. For both the scenarios of FIG. 4B and FIG. 4C, the resistivity values in the reservoir portions of scenarios 411 and 421 are increased from original anomaly values of 5 Ωm to values of 18 Ωm and 9 Ωm, respectively, and values in the remaining portions of the scenarios are decreased from 5 Ωm to 2 Ωm. Accordingly, the resistivity thickness product for the identified region of anomalous resistivity 401, 411, and 421 of FIG. 4A and scenarios 411 and 421 of FIGS. 4B and 4C are approximately the same (e.g., within a range of 10%).

Figure 5A:
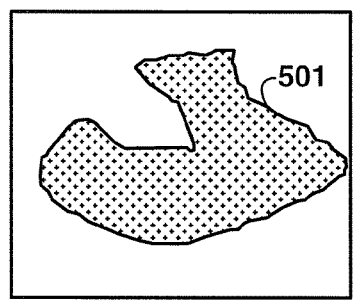
FIGS. 5A-5C show another region of anomalous resistivity and alternative scenarios therefore according to embodiments of the present invention.
Figure 5B:
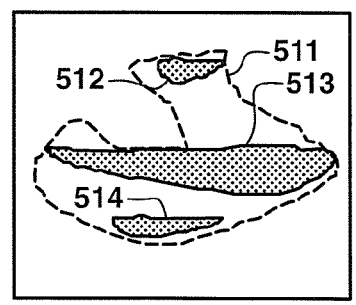
Figure 5C:
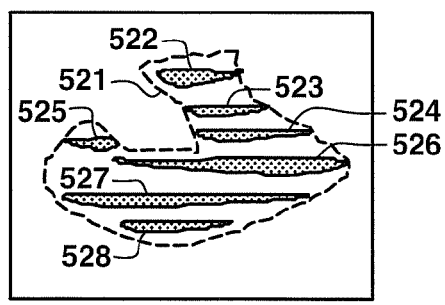

As another example, FIG. 5A shows 5 Ωm region of anomalous resistivity 501 and FIGS. 5B and 5C show two corresponding multi-feature scenarios which may be generated for 5 Ωm region of anomalous resistivity 501. Specifically, FIG. 5B shows scenaro 511 having three 9 Ωm portions 512-514 (such as may correspond to reservoirs, material structure, or other non-background feature) and the remaining portion of scenario 511 being 2 Ωm. FIG. 5C shows scenario 521 having seven 9 Ωm portions 522-528 (such as may correspond to a reservoir, material structure, or other non-background feature) and the remaining portion of scenario 521 being 2 μm. Although the number of portions 522-528 of scenario 521 in FIG. 5C is larger than that of FIG. 5B, their relative size is smaller. Accordingly, for both the scenario of FIG. 5B and FIG. 5C, the resistivity values in the portions 512-514 and 522-528 of scenarios 511 and 521 are increased from original anomalous resistivity 501 values of 5 Ωm to 9 Ωm, and values in the background portions of scenarios 511 and 521 are decreased from 5 Ωm to 2 Ωm, matching the background resistivity values of anomalous resistivity 501. In generating scenarios any one sub-region (e.g., portions 512-514 and 522-528 of scenarios 511 and 521) may typically contain 10% of the volume of the original anomaly, although any such sub-region may contain as much as 50% or as little as 5% of the volume of the original region.

Embodiments of the present invention assume that there is at least a two-dimensional anisotropy in the subsurface media and thus a procedure (e.g., vertical resistivity integrated over the vertical extent of the region of interest for one or more horizontal and/or vertical resitivities, transverse resistivity integrated over the lateral extent of the region of interest for one or more horizontal and/or vertical resistivities, volume-averaged resistivity anisotropy between one or more horizontal and/or vertical restivities, etc.) for generating scenarios as discussed above may be applied to either formation resistivities or to formation conductivities (see e.g., reissued U.S. Pat. No. RE39844 to Srnka, the disclosure of which is hereby incorporated herein by reference). An optimal procedure often depend upon the dip of the geologic beds within the anomalous resistivity or anomaly and upon the direction in which the averaging is performed. For generally horizontal beds, embodiments operate to thickness-average resistivity in the vertical direction to match the vertical resistivity of the anomaly and to thickness-average conductivities in the vertical direction to match the horizontal conductivity of the anomaly. For generally vertical beds, embodiments operate to thickness-average resistivity in the horizontal direction to match the horizontal resistivity of the anomaly and to thickness-average conductivity in the horizontal direction to match the vertical conductivity of the anomaly.

The foregoing scenarios may be developed or selected using information in addition to the electromagnetic data used to generate the resistivity image, which may be available from seismic data, well data, from a working knowledge of the physical properties and geometries of hydrocarbon reservoirs, etc. The particular structures of any scenario may be chosen, for example, because they have more geologically reasonable attributes, such as structural and stratigraphic relationships, geologic consistency, resistivity fit to structure and stratigraphy, etc., than the large diffuse anomalies. For example, seismic image data may be utilized with the resistivity image to identify individual strata of rocks, from which a model that populates various ones of those strata with hydrocarbons to generate scenarios which fit the observations without populating the entire region of anomalous resistivity with hydrocarbons. Using such techniques, a suite of scenarios may be generated which fit the observations and which may be further evaluated and analyzed for reasonableness as discussed below. It should be appreciated that in any particular situation there are likely to be a number of possible scenarios for how fluids and rocks could be distributed within a region of anomalous resistivity.

Seismic-scale scenarios may be developed by correlating, integrating or co-rendering the resistivity volume with depth-converted 2D or 3D seismic data, and correlating vertically diffuse resistive bodies with seismic zones of interest (see e.g., J. J. Carazzone et al., 2005, Three Dimensional Imaging of Marine CSEM Data, Expanded Abstracts, 75th Annual International meeting, Society of Exploration Geophysicists and L. MacGregor, et al., 2007, Derisking exploration prospects using integrated seismic and electromagnetic data—a Falkland Islands case study, The Leading Edge, 26, pp. 356-359, 2007 for detail with respect to co-rendering resistivity volumes from CSEM inversion with seismic data). Additionally or alternatively, borehole well log and other data may be used in developing scenarios according to certain embodiments of the invention. Scenarios may be developed, for example, by integrating resistivity images with other types of data, such as gravity data, which can be useful in identifying basement. Embodiments may develop scenarios based on look-alikes or geologic concepts, wherein a look-alike is a reservoir or other lithologic bed known to exist in a similar geologic setting elsewhere in the world. Libraries of various scenarios may be developed and stored, such as within storage device 121 (FIG. 1), for use with respect to various resistivity images.

At block 205 of the illustrated embodiment, one or more of the scenarios generated or otherwise identified at block 204 are evaluated. Scenarios may be evaluated by using forward and/or inverse modeling to determine each scenarios' fit to the available data. For example, where a 3D resistivity scenario model representing the scenario is built, electromagnetic (EM) and/or magnetotellurics (MT) data from this model are forward synthesized (e.g., by solving Maxwell's equations in a finite difference, finite element, or boundary integral formulation) and compared to the initial electromagnetic data. When inverse modeling is used, the 3D resistivity scenario model is input as a new starting model for inversion. Seismic data may additionally be forward modeled to ensure that the proposed structures of a scenario are consistent with the seismic reflection data.

Where evaluation shows that a scenario is not consistent with the subsurface data, that scenario is not used as a replacement for the corresponding identified region of anomalous resistivity in the resistivity image. However, where evaluation shows that a scenario is consistent with the subsurface data, that scenario is identified as a putative replacement for the corresponding identified region of anomalous resistivity in the resistivity image.

Before a particular scenario is substituted in a resistivity image for engineering analysis, economic analysis, planning, etc., the geologic reasonableness of the scenario is determined, as shown in block 206 of the illustrated embodiment. Geologic reasonableness may be determined in a number of ways. For example, thresholds representing little mismatch between measured and synthetic CSEM or MT data may be established such that, where EM inversion is used in scenario evaluation at block 205, measures of the difference between a final inversion model and the scenario may be compared to the threshold values for a determination of geologic reasonableness. Because many potential seismic-scale scenarios are below CSEM resolution, many scenarios may satisfy given threshold criteria. Accordingly, geologic reasonableness may additionally or alternatively be provided by comparing the fit to new or withheld data, such as drill well results, CSEM receivers or frequencies not used in generating the resistivity image in block 202, etc. Geologic reasonableness may also be determined by consistency and/or fit of a scenario to a subsurface geologic or geophysical model based on a working knowledge of the physical properties, geometries, and development processes of hydrocarbon reservoirs and other subsurface resistors.

As one example, a scenario may be determined not to be geologically reasonable because the resistivity of the feature exceeds that of any known similar feature in similar geologies. A scenario may be determined to be geologically reasonable, for example, where the features therein are of a size substantially conforming to other available data (e.g., seismic data) and to each have resistivity consistent with that of known features in similar geologies.

It should be appreciated that multiple scenarios can be generated, evaluated, and determined to be geologically reasonable for any particular region of anomalous resistivity. In some instances, such as probabilistic evaluations, populations of reasonable scenarios are desirable. For other purposes, such as reservoir analysis, a preferred scenario may be selected, based upon the scenario satisfying one or more resistivity or anisotropy threshold, a working knowledge of physical properties, geometries, and development processes of hydrocarbon reservoirs and other subsurface resistors, etc.

At block 207 of the illustrated embodiment, geologically reasonable scenarios are substituted for corresponding regions of anomalous resistivity in the resistivity images of the subsurface. The resulting resistivity images provide electromagnetic subsurface mapping of resistivity features which are consistent with the lower-resolution resistivity images produced from the electromagnetic data, but whose sizes are near to or below the resolution of the electromagnetic data. Such resistivity images may be utilized in analysis of the subsurface, such as for engineering analysis, economic analysis, planning, etc., to provide an understanding of the subsurface otherwise not available through electromagnetic subsurface mapping.

Although the flow diagram 200 illustrated in FIG. 2 illustrates a single pass through the various blocks thereof, certain embodiments of the invention may operate to repeat the operation of one or more such blocks, or portions thereof. For example, an embodiment of the invention may repeat blocks 204 (identifying scenarios), 205 (evaluating the scenarios), and 206 (determining the geologic reasonableness of scenarios) to identify one or more preferred scenarios for use in subsurface mapping. Where the geologic reasonableness of remaining scenarios after operation at block 206 is unlikely or less likely than desired (e.g., scenarios are inconsistent with some data or particular data), certain embodiments of the invention may operate to again identify other scenarios at block 204 to identify scenarios which fit the available data and which possess a greater level of geologic reasonableness. Additionally or alternatively, certain embodiments of the invention may operate to identify scenarios in groups sharing a similar attribute, feature, or other commonality at block 204, evaluate the scenarios of one such group at block 205, determine the geologic reasonableness of the remaining scenarios at block 206, and identify one or more best candidate scenarios of that group, and then repeat the operations of blocks 204-206 for each remaining group of scenarios. After a plurality of groups of scenarios have been processed, the resulting candidate scenarios may be analyzed to identify one or more scenarios, providing information regarding objects or features whose sizes are near to or below the resolution of the electromagnetic data which may accurately represent the identified area of interest, such as by assigning a likelihood to each such scenario.

Although embodiments have been described herein with reference to electromagnetic subsurface mapping used in hydrocarbon exploration, it should be appreciated that the concepts of the present invention may be applied with respect to many uses of electromagnetic subsurface mapping. For example, embodiments of the present invention may be utilized with respect to the entire cycle of hydrocarbon fields, including discovery, production, replenishment (e.g., pressure maintenance and injection), sequestration after depletion, etc. Accordingly, certain embodiments of the invention may be utilized with respect to production scale water encroachment within known producing reservoir levels.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method comprising:
   obtaining electromagnetic data regarding a subsurface area of interest;
   identifying a region of anomalous resistivity within at least one resistivity image, the at least one resistivity image representing the subsurface area of interest and being derived from the electromagnetic data regarding the subsurface area of interest, a region of anomalous resistivity being a region with resistivity greater than or less than surrounding regions, which surrounding regions are referred to as background regions of the image;
   generating a 2D or 3D resistivity scenario model for the region of anomalous resistivity and its background regions, said scenario model having a plurality of non-background features selected to have a resistivity thickness product that matches to within a predetermined tolerance a resistivity thickness product of the region of anomalous resistivity in at least one dimension, wherein each non-background feature is too small to be resolved in said at least one dimension at the resolution of the electromagnetic data, and the resistivity thickness product in a particular dimension is the product of resistivity in that dimension multiplied by thickness in that dimension; and
   evaluating, using a computer, the resistivity scenario model to determine a fit with known electromagnetic data for the subsurface area of interest by either forward modeling the resistivity scenario model or inverse modeling using the resistivity scenario model as starting model for inversion.

2. The method of claim 1, further comprising:
   generating the at least one resistivity image using controlled-source electromagnetic (CSEM) data.

3. The method of claim 1, further comprising:
   generating the at least one resistivity image using anisotropic inversion.

4. The method of claim 3, wherein the generating the resistivity image comprises:
   using an anisotropic vertically transverse isotropic model having horizontal and vertical resistivity.

5. The method of claim 1, wherein the at least one resistivity image comprises at least one image representing horizontal resistivity of the subsurface area of interest and at least one image representing vertical resistivity of the subsurface area of interest.

6. The method of claim 1, wherein the identifying the region of anomalous resistivity comprises:
   identifying a portion of the at least one resistivity image having a horizontal resistivity of at least 2.5 Ohm meters.

7. The method of claim 6, wherein the identifying the region of anomalous resistivity further comprises:
   identifying a portion of the at least one resistivity image having a vertical resistivity of at least 3 Ohm meters.

8. The method of claim 1, wherein the generating the resistivity scenario model comprises:
   generating a horizontal sequence of the non-background features whose thickness-averaged resistivity or conductivity is consistent with at least one horizontal resistivity or conductivity of the region of anomalous resistivity.

9. The method of claim 1, wherein the generating the resistivity scenario model comprises:
   generating a vertical sequence of the non-background features whose thickness-averaged resistivity or conductivity is consistent with a vertical resistivity or conductivity of the region of anomalous resistivity.

10. The method of claim 1, wherein the generating the resistivity scenario model comprises:
using a seismic image of the subsurface area of interest to suggest at least one of a location and a size of features within the resistivity scenario model.

11. The method of claim 1, wherein the generating the resistivity scenario model comprises:
using seismic amplitude-vs.-offset data or seismic amplitude-vs.-angle data to suggest at least one of a location and a size of features within the resistivity scenario model.

12. The method of claim 1, wherein the resistivity scenario model comprises a background resistivity region, wherein the non-background features comprise regions smaller than the background resistivity region, and wherein a resistivity of the background resistivity region is different than resistivity of the non-background features.

13. The method of claim 1, further comprising determining geologic reasonableness of the resistivity scenario model.

14. The method of claim 13, further comprising repeating the method for at least one alternative resistivity scenario model, and selecting a preferred resistivity scenario model based on the fit to known electromagnetic data and geologic reasonableness.

15. The method of claim 1, further comprising:
generating the resistivity scenario model by maintaining a volume-averaged resistivity anisotropy between at least one of horizontal resistivities and vertical resistivities to thereby provide the resistivity thickness product consistent with the resistivity thickness product of the region of anomalous resistivity.

16. The method of claim 1, wherein the at least one resistivity image comprises at least one three-dimensional image volume and the resistivity scenario model comprises a three-dimensional model for the region of anomalous resistivity.

17. The method of claim 1, wherein the electromagnetic data from which the resistivity image is derived are magnetotelluric (MT) survey data.

18. The method of claim 1, wherein the identifying a region of anomalous resistivity comprises:
determining expected resistivity in a target; and
selecting a region of anomalous resistivity within the at least one resistivity image having a resistivity within a threshold amount of the expected resistivity in the target.

19. The method of claim 18, wherein the determining expected resistivity in the target comprises at least one of:
using resistivity values from known wells;
interpreting seismic data;
interpreting geophysical data;
using geologic inference;
using physical property modeling;
using magneto-telluric modeling; and
using controlled-source electromagnetic modeling.

20. The method of claim 1, wherein the identifying a region of anomalous resistivity comprises:
analyzing geological information in addition to the at least one resistivity image;
wherein the geological information comprises information selected from a group consisting of depth of burial, seismic reflectivity, seismic character, interpreted environment of deposition maps, seismic amplitude-versus-offset, seismic amplitude-versus-angle, shape, amplitude relative to other geologic structures, porosity, and density.

21. The method of claim 1, wherein a resistivity thickness product of a scenario model will be considered to match the resistivity thickness product of the region of anomalous resistivity to within a predetermined tolerance if the resistivity product of the scenario model is within 10% of the resistivity thickness product of the region of anomalous resistivity.

22. The method of claim 1, further comprising repeating the method for at least one additional, different 2D or 3D resistivity scenario model, and selecting the resistivity scenario model evaluated as having a best fit with the known electromagnetic data for the subsurface area of interest.

23. A system comprising:
resistivity image data representing a subsurface area of interest stored in a computer readable medium, the resistivity image data having a region of anomalous resistivity defined thereby, a region of anomalous resistivity being a region with resistivity greater than or less than surrounding regions, which surrounding regions are referred to as background regions of the image;
at least one 2d or 3D resistivity scenario model having a plurality of non-background features therein stored in a computer readable medium, wherein the resistivity scenario model has a resistivity thickness product that matches to within a predetermined tolerance a resistivity thickness product of the region of anomalous resistivity in at least one dimension, and wherein each non-background feature is too small to be resolved in said at least one dimension at the resolution of the resistivity image data, and the resistivity thickness product in a particular dimension is the product of resistivity in that dimension multiplied by thickness in that dimension; and
a processor operable under control of an instruction set to evaluate the at least one resistivity scenario model to determine a fit with the resistivity image data by either forward modeling the resistivity scenario model or inverse modeling using the resistivity scenario model as starting model for inversion.

24. The system of claim 23, wherein the processor is further operable under control of the instruction set to evaluate the at least one resistivity scenario model to determine a fit with other known data for the subsurface area of interest.

25. The system of claim 23, wherein the processor is further operable under control of an instruction set for determining geologic reasonableness of the resistivity scenario model.

26. The system of claim 23, wherein the at least one resistivity scenario model comprises a plurality of resistivity scenario models, each resistivity scenario model of the plurality of resistivity scenario models having a different configuration of non-background features therein.

27. The system of claim 23, further comprising:
seismic information stored in a computer readable medium, at least a portion of the seismic information having been used in generating the at least one resistivity scenario model.

28. The system of claim 23, further comprising:
well information stored in a computer readable medium, at least a portion of the well information having been used in generating the at least one resistivity scenario model.

29. The system of claim 23, wherein two resistivity thickness products will be considered to match each other to within a predetermined tolerance if their resistivity thickness product values are within 10% of each other.

30. The system of claim 23, further comprising:
revised resistivity image data representing the subsurface area of interest stored in a computer readable medium, the revised resistivity image data having a resistivity scenario model of the at least one resistivity scenario model replacing the region of anomalous resistivity.

* * * * *